UNITED STATES PATENT OFFICE.

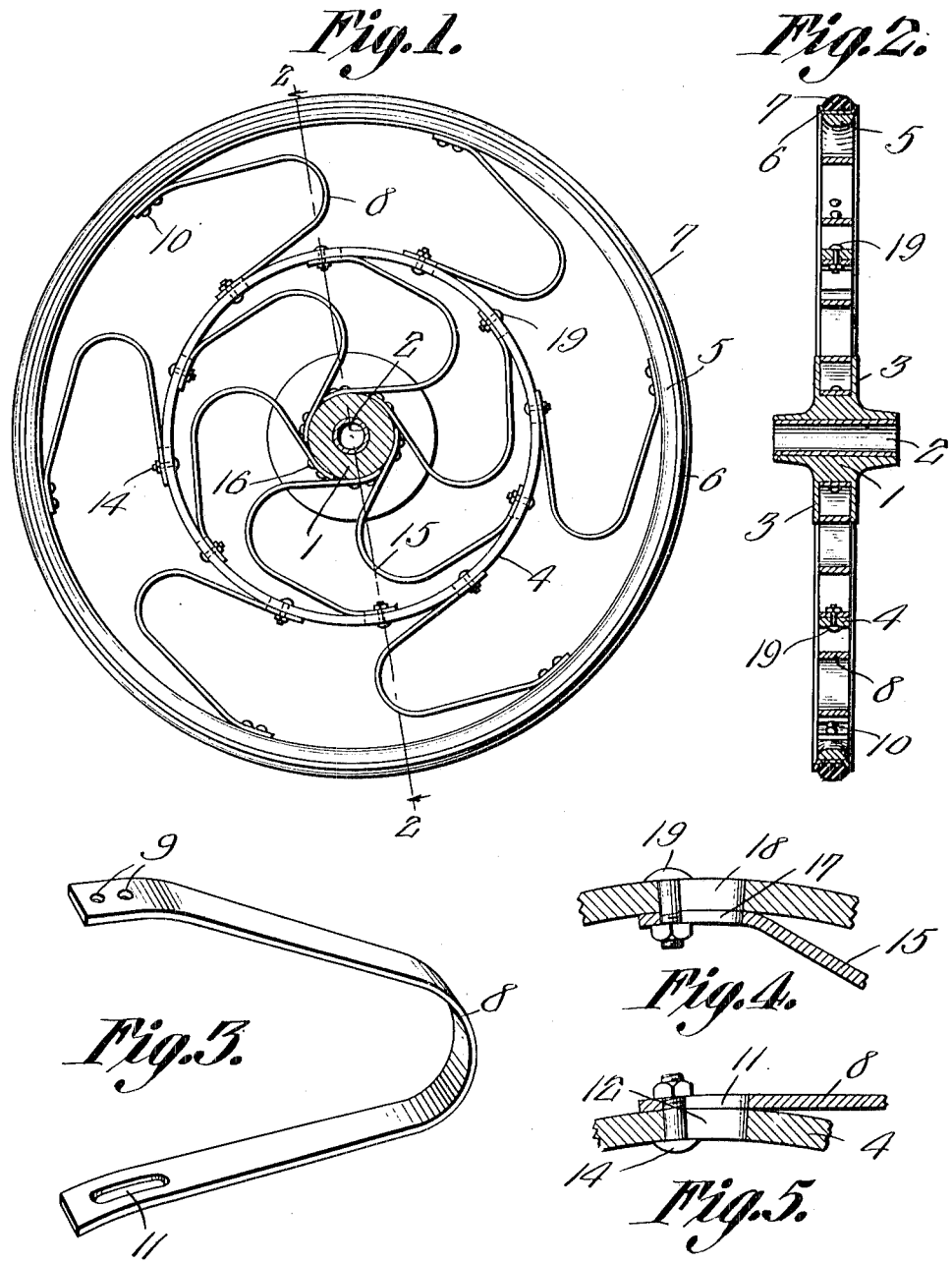

ABRAHAM MORGAN, OF INDEPENDENCE, MISSOURI.

SPRING-WHEEL.

1,080,649.

Specification of Letters Patent. Patented Dec. 9, 1913.

Application filed October 17, 1912. Serial No. 726,330.

*To all whom it may concern:*

Be it known that I, ABRAHAM MORGAN, a citizen of the United States, residing at Independence, in the county of Jackson and State of Missouri, have invented a new and useful Spring-Wheel, of which the following is a specification.

One object of the present invention is to provide a wheel, depending for its resiliency upon internal springs, to the end that pneumatic tires may be dispensed with.

The invention aims, further, to provide a novel arrangement of springs whereby the desired resiliency is afforded.

Specifically, the invention aims to provide a wheel in which a resilient ring is interposed between the hub and a rigid rim, a novel arrangement of springs being interposed between the ring and the hub upon the one hand and between the ring and the rim upon the other hand.

The invention aims, further, to increase the utility of devices of that type to which the present invention appertains, and to provide novel means whereby the tension of the springs of the wheel may be adjusted.

With the foregoing and other objects in view which will appear as the description proceeds, the invention resides in the combination and arrangement of parts and in the details of construction hereinafter described and claimed, it being understood that changes in the precise embodiment of invention herein disclosed can be made without in the scope of what is claimed without departing from the spirit of the invention.

In the accompanying drawing, Figure 1 shows the invention in side elevation, the hub being sectioned; Fig. 2 is a transverse section on the line 2—2 of Fig. 1; Fig. 3 is a perspective of one of the primary springs; and Figs. 4 and 5 are vertical sections through the spring ring and attached parts.

In the drawing, the numeral 1 indicates the hub of a wheel, the same being bushed as shown at 2. Generally considered, the hub of the wheel will be constructed to meet the exigencies of the proposed use. The hub 1 is equipped with projecting side plates 3.

The invention further includes a resilient ring 4 and a rim which is a composite structure. The rim may be of any desired sort, but in the present instance it is shown as comprising a felly 5, a tire plate 6 and a tire 7. Interposed between the felly 5 and the resilient ring 4 are primary springs 8.

The primary springs 8 are of arched construction and at their outer ends are provided with openings 9, adapted to receive securing elements 10, whereby the outer ends of the primary springs may be connected with the felly 5 or with any other portion of the wheel rim. The inner ends of the primary springs 8 bear against the outer face of the spring ring 4. The inner ends of the primary springs are longitudinally slotted as indicated at 11, the slots 11 being alined with slots 12 which are formed in the spring ring 4. Bolt and nut connections or the like, indicated at 14, are mounted in the slots 11 and 12 and constitute means for maintaining the inner ends of the primary springs 8 assembled with the resilient ring 4.

The invention further includes secondary springs denoted by the numeral 15, the springs being of arched form, and being substantial duplicates of the springs 8. The secondary springs 15 are interposed between the hub 1 and the resilient ring 4, the outer ends of the springs 15 bearing against the inner face of the ring 4 and the inner ends of the springs 15 bearing against the outer face of the hub 1. By means of securing elements 16, the inner ends of the springs 15 are secured to the hub 1. The outer ends of the springs 15 are longitudinally slotted as shown at 17, the slots 17 being alined with slots 18 which are formed in the resilient ring 4. Bolt and nut connections or the like, indicated at 19, lie in the slots 17 and 18 and constitute means for securing the outer ends of the secondary springs 15 to the spring ring 4. The outer ends of the secondary springs 15 alternate with the inner ends of the primary springs 8, circumferentially of the ring 4.

Attention is directed to the fact that the ring 4 is resilient, and when a weight is applied to the wheel hub 1, the same will be transmitted through the springs 15 to the resilient ring 4, causing a distortion of the ring 4, the same putting the springs 8 under tension. Owing to the fact that the secondary springs 15 are engaged by the side plates 3, lateral movement of the wheel rim will be prevented. It is to be noted, further, that the construction of the springs 15 and 8 and of the resilient ring 4 is such that although these elements are adapted to yield responsive to a thrust parallel to the median plane of the wheel, the said elements will resist a lateral movement, the greatest dimensions of the resilient elements being at right angles to the median plane of the wheel. An adjustment in the tension of the springs 15 and 8 may be effected by loosening, respectively, the bolt and nut structures 19 and 14, the bolt and nut structures being shifted in their respective slots 18 and 12 until the desired tension has been obtained.

Having thus described the invention what is claimed is:—

1. In a wheel, a hub; a rim; a resilient ring interposed between the hub and the rim; springs connecting the ring with the rim; springs connecting the ring with the hub; the adjacent ends of the springs being adjustable upon the ring, circumferentially of the ring, to vary the tension of the springs; and means for securing the adjacent ends of the springs to the ring.

2. In a wheel, a hub; a rim; a resilient ring interposed between the hub and the rim, springs interposed between the ring and the rim; springs interposed between the ring and the hub; the springs being provided with slots extending circumferentially of the ring and securing devices connected with the ring, the securing devices being adjustable in the slots to vary the tension of the springs.

3. In a wheel, a hub; a rim; a resilient ring interposed between the hub and the rim; arched springs located between the ring and the rim and connected at their outer ends with the rim; arched springs located between the ring and the hub and connected at their inner ends with the hub; the adjacent ends of the springs and the ring being provided with slots which extend circumferentially of the wheel; and securing devices adjustable in the slots of the springs and of the ring, thereby to permit the adjacent ends of the springs to be shifted circumferentially of the wheel, to vary the tension of the springs.

In testimony that I claim the foregoing as my own, I have hereto affixed my signature in the presence of two witnesses.

ABRAHAM MORGAN.

Witnesses:
G. E. HARRINGTON,
L. H. HAAS.